United States Patent [19]

Ahlen et al.

[11] 4,262,554

[45] Apr. 21, 1981

[54] HYDRAULIC VALVE SYSTEM FOR CONTROLLING PARTICULARLY A VEHICLE GEARBOX

[75] Inventors: Karl G. Ahlen, Bromma; Rainer B. Ketola, Stockholm, both of Sweden

[73] Assignee: S.R.M. Hydromekanik Aktiebolag, Stockholm-Vallingby, Sweden

[21] Appl. No.: 66,859

[22] Filed: Aug. 15, 1979

[30] Foreign Application Priority Data

Aug. 24, 1978 [GB] United Kingdom ............... 34391/78
Nov. 21, 1978 [GB] United Kingdom ............... 45431/78

[51] Int. Cl.³ ............................................. F16H 47/00
[52] U.S. Cl. ..................................... 74/677; 74/868; 74/878; 137/596.16; 137/637.1
[58] Field of Search ................. 74/868, 866, 677, 878; 137/98, 596.16, 596, 637.1; 91/526, 531; 192/3.57, 3.58

[56] References Cited

U.S. PATENT DOCUMENTS

| 2,255,787 | 9/1941 | Kendrick | 137/98 X |
|---|---|---|---|
| 3,038,449 | 6/1962 | Murphy et al. | 137/596.16 X |
| 3,175,470 | 3/1965 | Schwartz et al. | 137/596 X |
| 3,292,659 | 12/1966 | Raeber et al. | 137/596.16 |
| 3,452,781 | 7/1969 | Napolitano | 137/596.16 X |
| 3,554,234 | 1/1971 | Kurtz | 137/596.16 X |
| 3,613,509 | 10/1971 | Flascher et al. | 137/596.16 X |
| 3,720,059 | 3/1973 | Schurawski et al. | 91/531 X |
| 3,780,602 | 12/1973 | Thornley | 74/878 X |
| 3,874,255 | 4/1975 | Minami | 74/866 |
| 3,918,488 | 11/1975 | Minami | 137/596.16 |
| 3,921,479 | 11/1975 | Katz | 91/526 X |
| 3,943,973 | 3/1976 | Zetiergren | 137/596.16 X |
| 3,971,216 | 7/1976 | Miller | 91/531 X |
| 3,976,097 | 8/1976 | Brakel | 91/531 X |
| 4,010,660 | 3/1977 | Ahlen | 74/677 X |
| 4,056,019 | 11/1977 | Ahlen | 74/677 |
| 4,067,357 | 1/1978 | Ruchser | 137/596.16 |
| 4,094,211 | 6/1978 | Espenschied | 74/868 |
| 4,138,004 | 2/1979 | Horsch | 192/3.57 |
| 4,161,256 | 7/1979 | Seaberg | 91/526 X |

FOREIGN PATENT DOCUMENTS 1208855 10/1970 United Kingdom ..................... 91/531

Primary Examiner—Rodney H. Bonck
Attorney, Agent, or Firm—Larson and Taylor

[57] ABSTRACT

A hydraulic valve system for controlling operation of a motor vehicle gear box comprising a plurality of multi way valves of the disc-type in which the first multi way valve conveys pressure fluid to either one of two consumers and drains the consumer to which fluid is not conveyed, one of the two consumers comprising a valve system having two or three of the said multi way valves, each of which is operable to supply pressure fluid to one or other of two further consumers, and means to interlock the said two or three multi way valves so as to permit connection to only one of four or six consumers at any one time.

23 Claims, 21 Drawing Figures

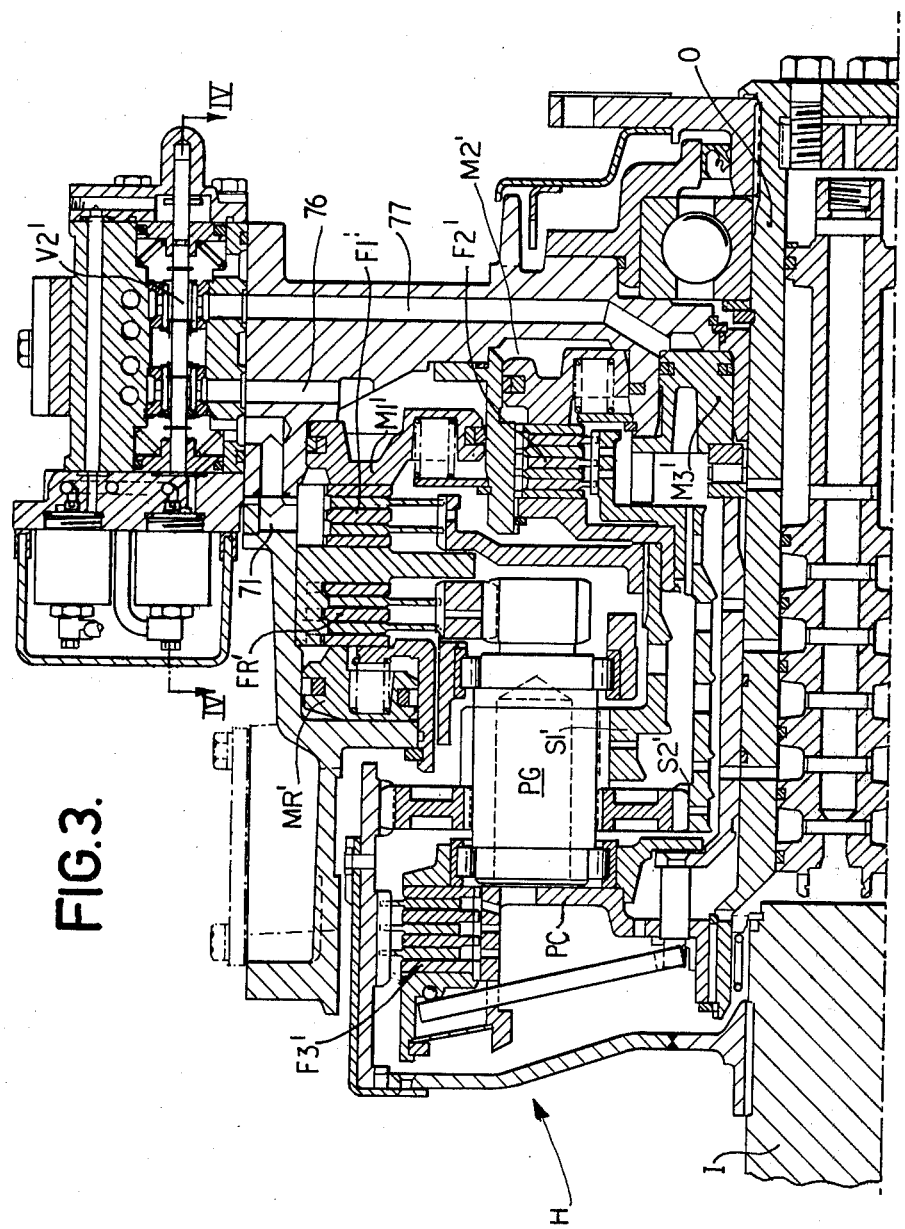

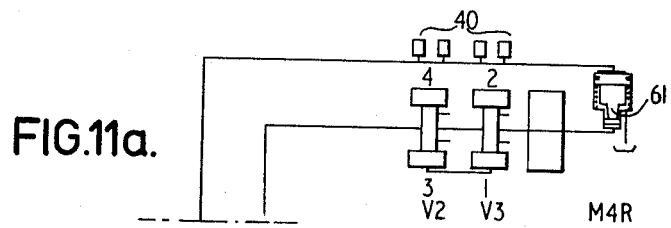
FIG.11a.
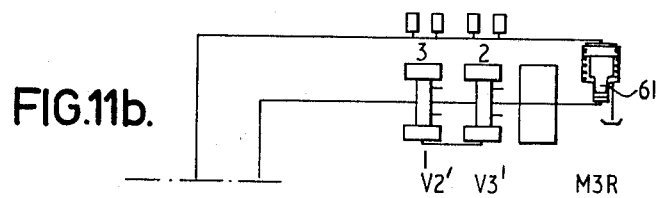
FIG.11b.
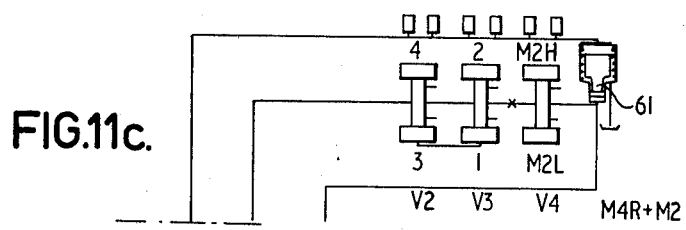
FIG.11c.
FIG.11d.
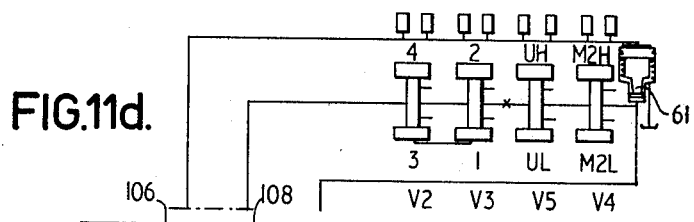
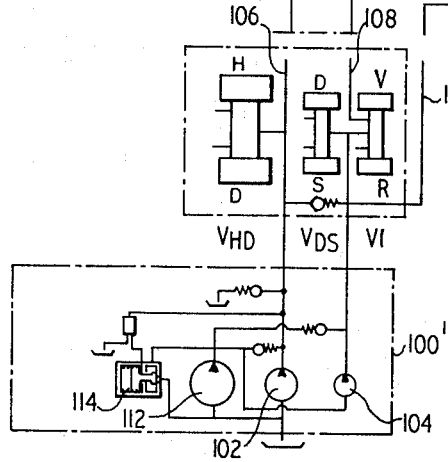

HYDRAULIC VALVE SYSTEM FOR CONTROLLING PARTICULARLY A VEHICLE GEARBOX

The invention relates to a hydraulic valve system for controlling in particular a vehicle gearbox with at least three forward gears and one reverse gear, which gears can be engaged by a servomotor which can be operated by pressurised fluid from a source of pressurised fluid.

The demands for efficiency of automatic hydromechanical vehicle gearboxes have increased to such an extent that hydrodynamic torque converters are now combined with mechanical change-speed gearboxes which have at least three forward gears and one reverse gear. In certain cases, up to 16 mechanical gear steps are applied which are shifted hydraulically by means of servomotors acting on friction brakes and clutches within the gearbox.

With the aim of achieving a smooth change between gears and at the same time, ensuring a considerable holding force in the brakes and clutches in the engaged state, it is known (U.S. Pat. No. 4,176,564) to determine the increase in the actuating pressure of the servomotors for each gear shift so that the servomotors are initially filled with a oil at low pressure and thereafter a higher holding pressure is generated and maintained by an additional hydraulic pump. The hydraulic valves which are used must accordingly meet quite a number of demands, namely, (i) expose a large throughflow cross-sectional port area when open;

(ii) in the closed state, offer the smallest possible leakage gaps in order to minimize liquid losses which would otherwise have to be met by the high pressure pump and in order to keep efficiency high to achieve this demand would minimize the size of the high pressure pump;

(iii) to maintain a good seal, and be as insusceptible to wear as possible;

(iv) open and close reliably even after the inevitable contamination of the hydraulic fluid, and (v) be suitable for automatic actuation by being perfectly controlled by electrohydraulic valves.

At the same time, no two such valves should be allowed to open simultaneously since this could lead to the simultaneous engagement of two gear trains which would result in considerable damage to the gearbox or even the vehicle itself.

These demands are not met by the hydraulic valves hitherto used in vehicle gearboxes. With a view to obtaining operational reliability even under greatly differing temperatures, the previously generally used multi-position piston valves were made with excessive clearance in the pistons inside the valve bore and this resulted in an increase in wear and tear. At the same time, the flow cross-sections are relatively small and the resistance to flow within the valve is therefore correspondingly high. Also, the replacement of such piston valves by gate valves provided with communicating passages and in which the gates run on plane mating surfaces cannot satisfy the above requirements. Further, the flow losses in gate valves are high and most important, the seal between gate and gate valve housing becomes increasingly impaired by wear and tear and effects of temperature. Furthermore, the hydraulic actuation of such gate valves which are likewise constructed as multi-position valves, presents difficulty with regard to the safe, quick and accurate assumption of the various valve positions. Gate valves are, moreover, complicated to manufacture and are correspondingly expensive. The use of known valves and their failure for one reason or another ultimately leads to breakdown or destruction of the clutches and brakes.

The invention is therefore concerned with a solution to the problem of providing a system of hydraulic valves particularly for the field of application specifically mentioned at the outset of this specification and which is characterised by simplicity and low cost in manufacture, low resistance to flow, small leakage flow as well as insensitivity to dirt and wear even under greatly fluctuating temperatures and operating conditions and which nevertheless excludes the possibility of simultaneous parallel engagement of two gears.

According to the present invention, there is provided a hydraulic valve system comprising a plurality of multi-way valves of the disc-type of the type shown in commonly owned prior U.S. Pat. No. 4,056,019, in which the first multi-way valve conveys pressure fluid to either one of two consumers and drains the consumer to which fluid is not conveyed, one of the two consumers comprising a valve system having two or three of the said multi-way valves, each of which is operable to supply pressure fluid to one or other of two further consumers, and means to interlock the said two or three multi-way valves so as to permit connection to only one of four or six consumers at any one time.

The hydraulic valve system according to the invention is particularly but not exclusively suitable for controlling in particular a vehicle gear box having at least three forward gears and one reverse gear, each gear of which can be engaged by a servomotor to be operated by pressure fluid through the said valve system. In a vehicle gear box, the first consumer is a servomotor for the reverse gear brake and the second consumer is the interlocked valve system, in which each multi-way valve thereof is selectively operable to convey pressure fluid to either one of its two consumer servomotors and simultaneously drain the other consumer servomotor when the other valves in the interlocked system drain their consumer (servomotors).

Considered slightly differently the invention seeks to overcome the above mentioned problem in that upstream of each servomotor there is disposed a plate valve having two valve plates which can be operated in opposite directions, upon operation of which, against a restoring force, one valve plate opens a port between the pressure connection and the consumer connection of the valve while the other valve plate closes a port between the consumer connection and a pressure-free outlet, and in that there is upstream of the plate valves controlling the forward gears, on the pressure side, a further valve which is so connected with the consumer connection of which the pressure connections of the plate valves controlling the forward gears are connected parallel with one another, and in that the further plate valve and the plate valve controlling the reverse gear are combined into, 4/3 or 5/3-way valve and in that the plate valves controlling the forward gears are so interlocked with respect to one another that they are only individual operable.

The combination of two plate valves with in each case two valve plates to form one 4/3 or 5/3-way valve is indeed already known in the case of hydrodynamic-mechanical vehicle gearboxes (German Pat. No. 25 05 582). There, such valves are however individually used for shifting between in each case only two conditions of operation such as converter operation/direct drive, double rotation/single rotation, forward drive/reverse drive, so that the problems in which the invention is based do not even arise.

In this specification, the designation 4/3 valves is used with reference to international standards in which the first figure "4" signifies that the valve has four connections, namely a pressure connection, a pressure-free outlet and two consumer connections. The second figure "3" on the other hand gives the number of possible valve positions. In the midway position or inoperative position, which is constructed as a so-called "floating position", the pressure connection is blocked and the two consumer connections are connected to the pressure-free outlet. In the two operating positions adjacent thereto, the pressure connection is in each case connected to a consumer and the pressure-free outlet is connected to the other consumer. It is evident that it is possible also to provide separate outlets for the two consumers so that altogether five connections are provided. The standard designation then reads "5/3-way valve".

The invention, therefore, provides a hydraulic valve system which, in solving the problems with which the invention is concerned, permits rapid gear shifting and prevents the overlapping of individual gears and which at the same time is simple and inexpensive to produce.

The hydraulic valve system according to the invention can also be applied to other fields in which corresponding requirements exist and which are not satisfied by the known hydraulic valve systems.

In an advantageous further development of the invention, at least some of the plate valves controlling the forward gears are combined in pairs to form one or more 4/3 or 5/3-way valves. This provides the essential conditions for a multi-position valve for controlling two forward speeds and a plate valve controlling a further forward speed or a second valve controlling two forward speeds to be located one beside another in a common housing and to be mechanically interlocked therein, such interlocked valves providing a particularly favourable structural realization of the hydraulic valve system according to the invention.

According to one arrangement for establishing the interlock, each of the two mutually interlocked valves has an axially movable positioning member with a recess directed towards the positioning member of the other valve and, between the two position members there is disposed a longitudinally movable interlocking member which engages alternately in one or other of the two recesses. To this end the recesses are provided with inclined faces for movement of the interlocking member from one recess into the other upon actuation of one of the positioning members. Such an arrangement also enables restoration of the other positioning member to its inoperative position. It is thus possible in a particularly advantageous manner for each valve to reciprocally influence another valve, not only with regard to interlocking but also with regards to restoration of a previously operable valve to its neutral position.

In order to permit the assembly of such a mutually interlocked group of valves, for the interlocking member may be divided into two thrust members which are longitudinally displaceable coaxially of each other, and which are held in spaced relationship from each other by an intermediate member such as a ball which can be inserted laterally into the path of the thrust members.

A particularly advantageous further development of the invention provides a common housing which accommodates all the valves with their valve bores parallel with one another. Such a common housing may include at least three valves of which at least two are constructed as 4/3 and 5/3-way valves with the inlet chambers connected to the pressure connections and located substantially centrally inside the valve bores, with the outlet chambers connected to the pressure-free outlets disposed at the ends of the valve bores and with consumer chambers connected to appropriate consumer connections at positions in between the inlet and the outlet connections.

By the grouping together of several valves constructed as plate valves into a common housing, according to the invention, with mutual hydraulic and/or mechanical interlock among them, a structural unit is created which can be easily dismantled and installed and which in its basic construction permits of manifold modifications to suit different applications.

The invention, will now be described by way of example, with reference to the accompanying drawings, in which:

FIG. 1 shows a circuit diagram of the hydraulic and electrical control system of a diagrammatically shown hydrodynamic-mechanical combined gearbox used in conjunction with a hydraulic torque converter having brakes for causing either single rotation or double-rotation of the guide member and a change-speed gearbox for eight forward and two reverse gears, formed by two serially disposed epicyclic gear systems.

FIG. 3 shows in horizontal longitudinal section the construction of a vehicle gearbox according to FIG. 2B with a hydraulic valve assembly; flanged onto the valve body, the sectional view showing only one 4/3-way valve;

Figure 7:
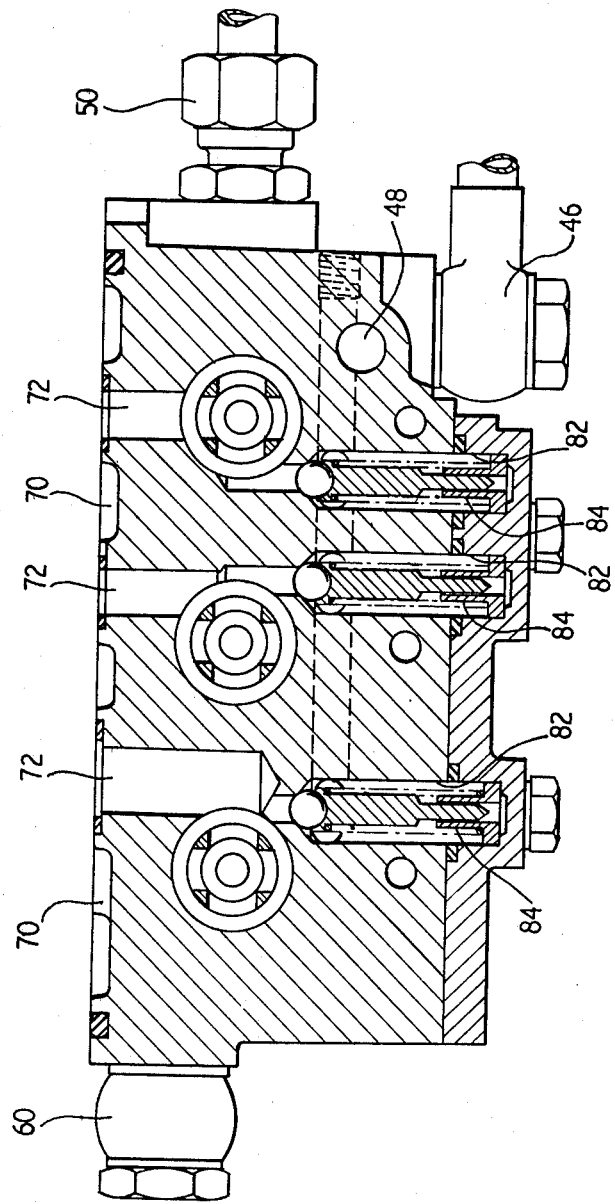
FIG. 7 shows a further cross-section taken on the line VII—VII in FIG. 4.
Figure 8:
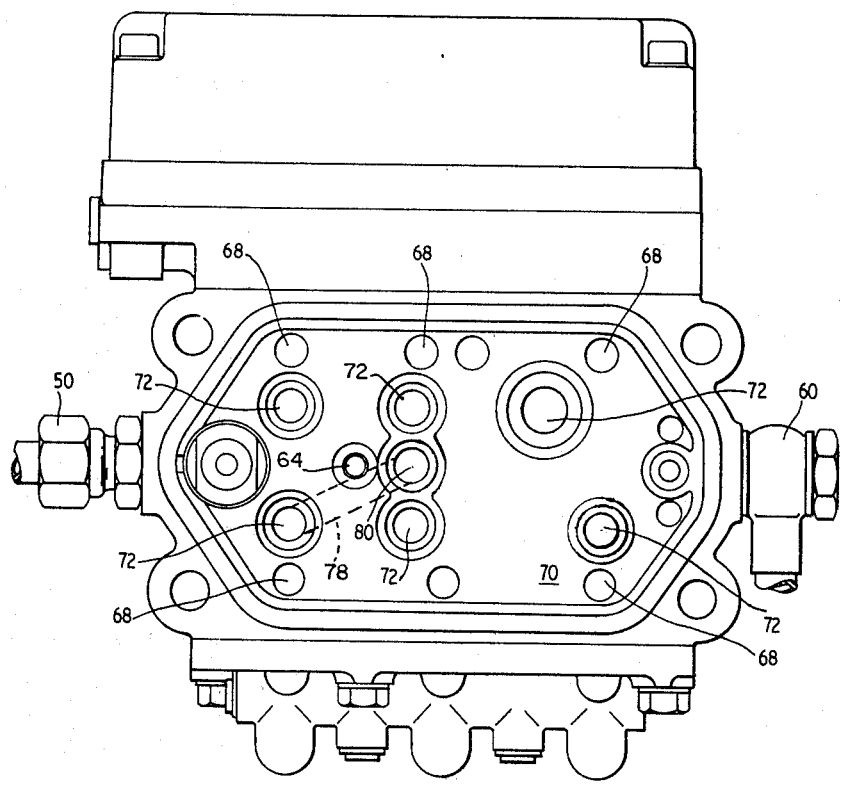
FIG. 8 is a rear view of the valve assembly of FIGS. 4–7.
Figure 9A:
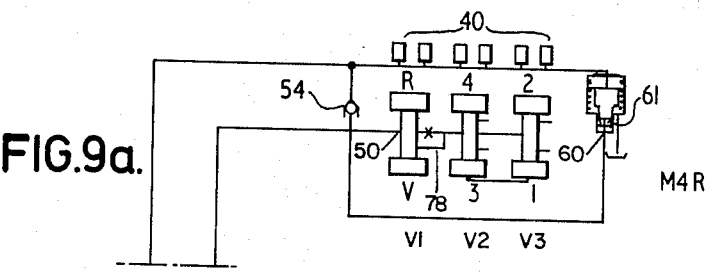
Figure 9B:
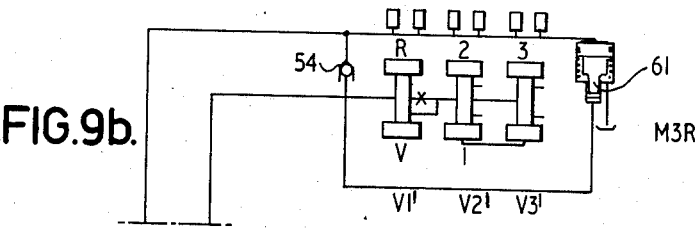
Figure 9C:
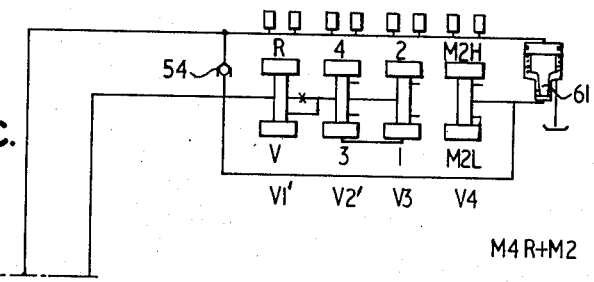
Figure 9D:
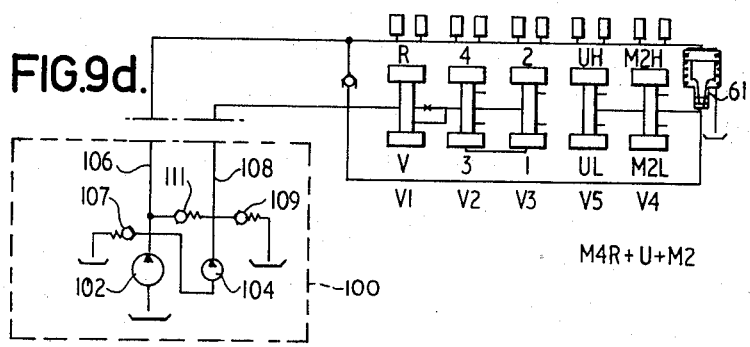
Figure 10A:
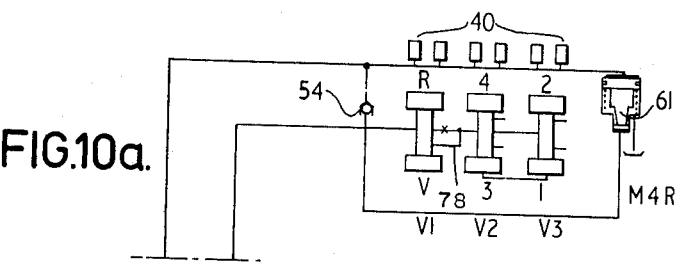
Figure 10B:
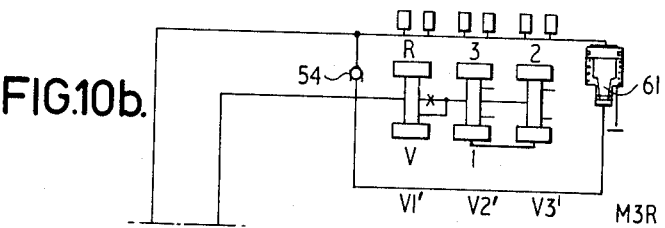
Figure 10C:
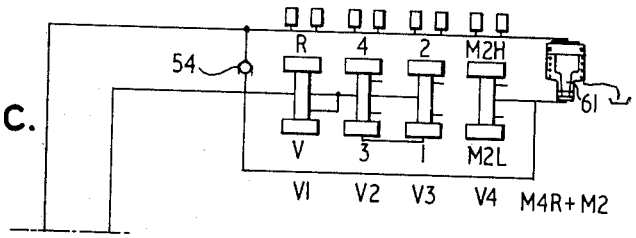
Figure 10D:
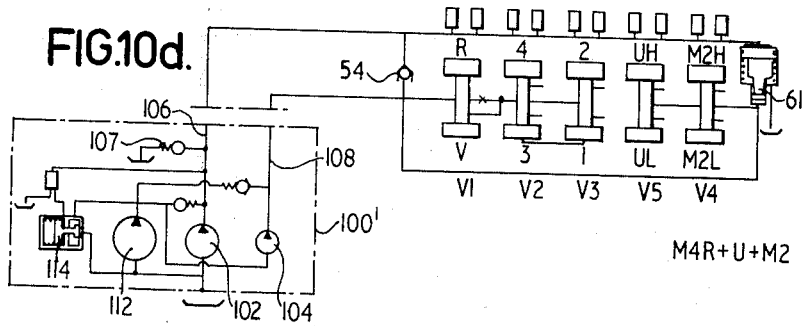

FIGS. 9a–9d diagrammatically show four examples of applications illustrating the various usage of the valve assembly of FIGS. 4 to 8, in some cases employing further valves which may be additionally accommodated in the housing, the pressurised medium source being a relatively large low-pressure jump and a smaller high-pressure pump, wherein the pressure source 100 shown as part of FIG. 9d applies also to FIGS. 9a, 9b and 9c;

FIGS. 10a–10d are similar views to those in FIGS. 9a–9d of the same examples of application, whereby however a further low pressure pump which can be operated if necessary is disposed within the source of pressurised medium and wherein the pressure source 100' shown as part of FIG. 10d applies also to FIGS. 10a, 10b and 10c; FIGS. 11a–11d diagrammatically show four other examples of application illustrating the same usage of the valve assembly as in FIGS. 10a–10d, but in which the 4/3-way valve optionally shifting the reverse gear or preparatively all forward gears is, together with two further such way valves, provided separately for controlling a hydrodynamic-mechanical gearbox, and wherein the pressure source 100' and the torque converter controls shown in FIG. 11d apply also to FIGS. 11a, 11b and 11c.

Figure 1:
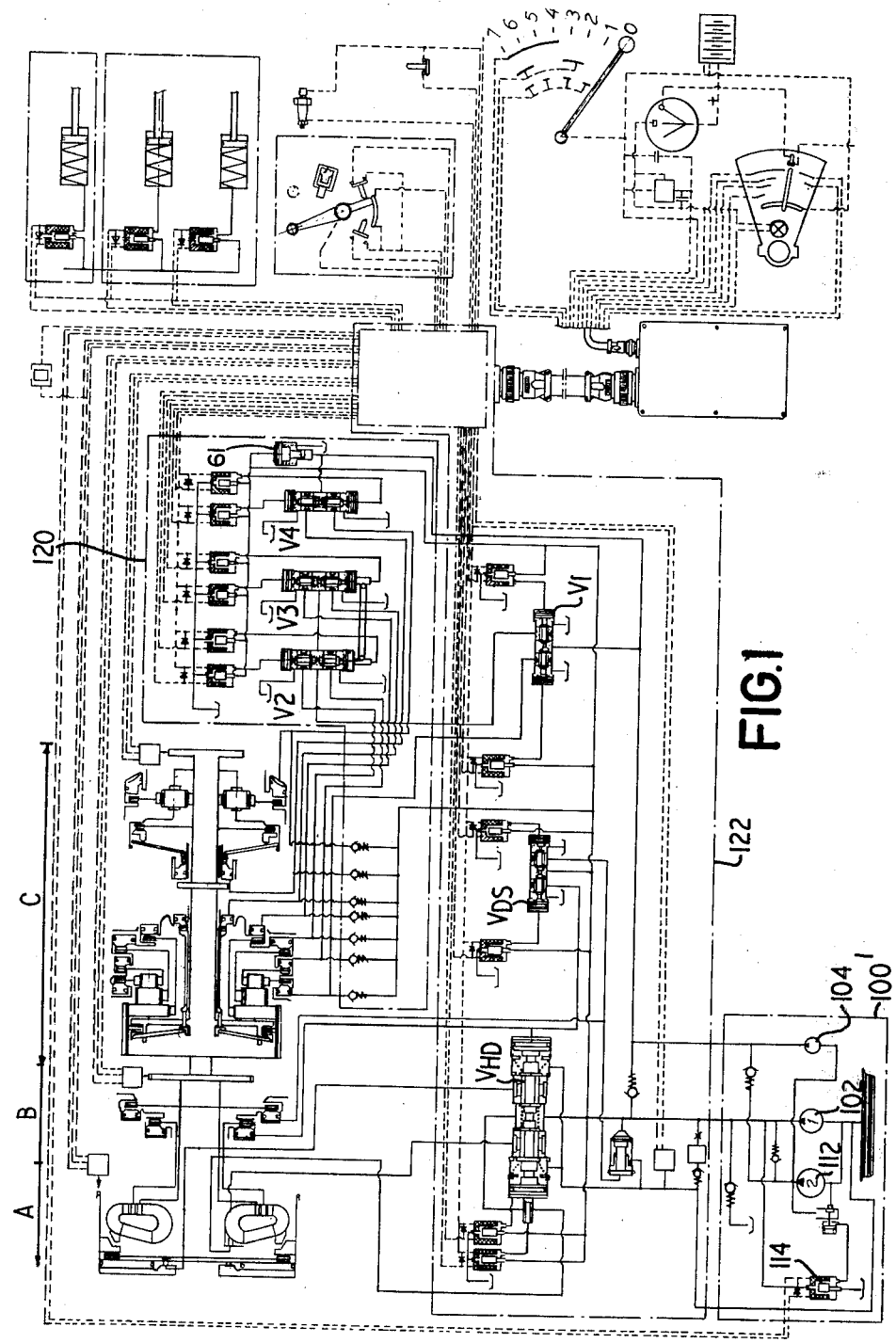

The entire hydraulic and electrical circuitry for the control system of a combined hydrodynamic-mechanical gear mechanism for a motor vehicle is shown in FIG. 1. This combined transmission consists of a diagrammatically indicated double rotation hydraulic torque converter A, having a so-called double rotation control portion B for the guide disc of the converter and a change speed gear mechanism C which can be shifted under load and which consists of two serially disposed epicyclic gear mechanisms, of which the first is an M4R gear i.e., it has four forward speeds and a reverse gear, and the other is an M2 gear, i.e. it has two forward speeds, both of which gears are to be described below. Reference numeral 120 denotes the valve assembly according to FIG. 11c, combined into one common housing comprising the 4/3-way valves V2, V3 and V4 as well as the pressure limiting valve 61. The valve V1 together with the valve VHD and the valve VDS, forms a further valve assembly 122. Reference numeral 100' denotes the pressure fluid source containing the two low pressure pumps 102, 112 and the high pressure pump 104 as well as the by-pass valve 114.

Figure 2A:
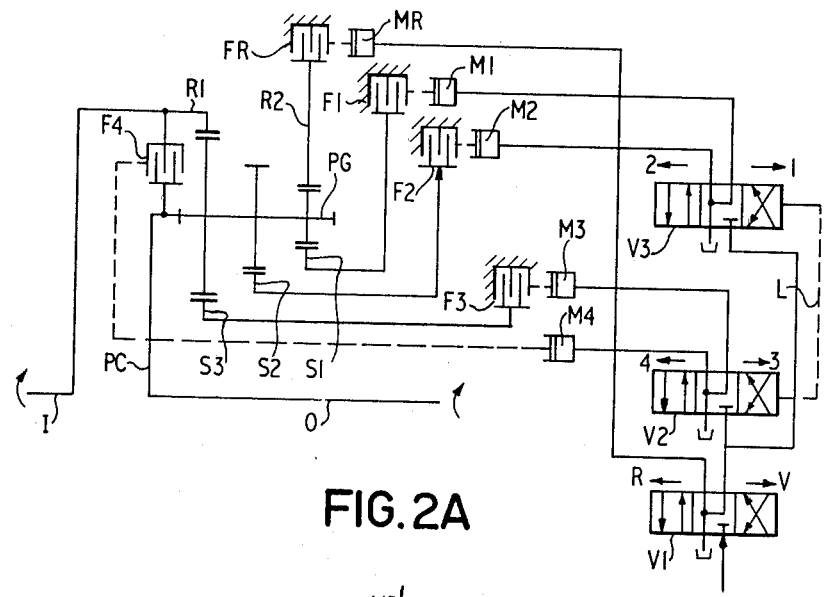
FIG. 2A is a diagrammatic view of a vehicle gearbox constructed as an epicyclic gearing with four forward gears and one reverse gear and showing diagrammatically a first embodiment of the hydraulic valve system according to the invention for controlling this gearbox, with three 4/3-way valves.

The vehicle gearbox shown diagrammatically in FIG. 2a is an epicyclic gear system which can be shifted under load, and having, rotationally rigid with the gearbox output shaft 0, a single planet carrier PC which carries a number of planet gears PG distributed over its periphery. Each planet gear PG has three tooth systems of differently sized diameter, of which the largest meshes with a ring gear R1 which is rotationally rigidly connected to the gearbox input shaft I. Three sun wheels of different diameter S1, S2 and S3 mesh each with one of the three tooth systems on the planet gear PG and, in order to establish three different reduction gearings corresponding to a first, second and third forward speed, capable of being braked by engagement of friction, brakes F1, F2, F3 respectively, which are fixed with respect to the housing. Also meshing with the teeth of smallest diameter of planet gear PG is a further ring gear R2 which in order to establish a greatly reduced reverse gear, can be braked by a friction brake FR which is also fixed with respect to the housing. Finally, engagement of a friction clutch F4 disposed between the drive-side ring gear R1 and the plant carrier PC establishes direct drive which corresponds to a fourth forward gear.

All friction brakes F1, F2, F3 and FR and the friction clutch F4 can be operated against the force of (not shown) restoring springs by their associated pressurised fluid actuated servo motors M1, M2, M3, M4, and MR. For controlling the individual supply of pressurised fluid to the servomotors, there are three 4/3-way valves V1, V2 and V3, shown in principle with their standard circuit diagrams. According to international standards, the first figure "4" signifies that the valve has four connections, namely a pressure connection, a pressure-free outlet and two consumer connections. The second figure "3" on the other hand gives the number of possible valve positions. In the midway position or inoperative position, which is constructed as a so-called "floating position", the pressure connection is blocked and the two consumer connections are connected to the pressure-free outlet. In the two operating positions adjacent thereto, the pressure connection is in each case connected to a consumer and the pressure-free outlet is connected to the other consumer. It is evident that it is possible also to provide separate outlets for the two consumers so that altogether five connections are provided. The standard designation then reads "5/3-way valve".

In order to prevent the simultaneous operation of two servomotors which would have particularly catastrophic consequences in the event of simultaneous engagement of reverse gear and of forward gear, the valve V1 which has its pressure connection connected directly to a (not shown) pressurised fluid source and one of its consumer connections connected to the servomotor MR for reverse gear, is installed on the pressure side, upstream of the two other valves: in other words, the second consumer connection of the valve V1 is connected to the pressure connections of the other two valves V2, V3, the consumer connections of which lead to the servomotors M1 to M4 for the forward gears. Thus, the supply of pressurised fluid to the forward gear servos is out of the question when reverse gear is engaged and vice versa. In order also to prevent the simultaneous engagement of two forward gears, the valves V2 and V3, as indicated by the broken line L, are so interlocked in respect of each other that either of these valves can be moved out of the inoperative position into one or other of the working positions only when the other valve simultaneously assumes its inoperative position. This system of interlock can occur on the actuating side of the valves, mechanically, electrically or hydraulically. A particularly effective mechanical interlock is described hereinafter in conjunction with an actual example of an embodiment of the valve arrangement according to the invention.

Figure 2B:
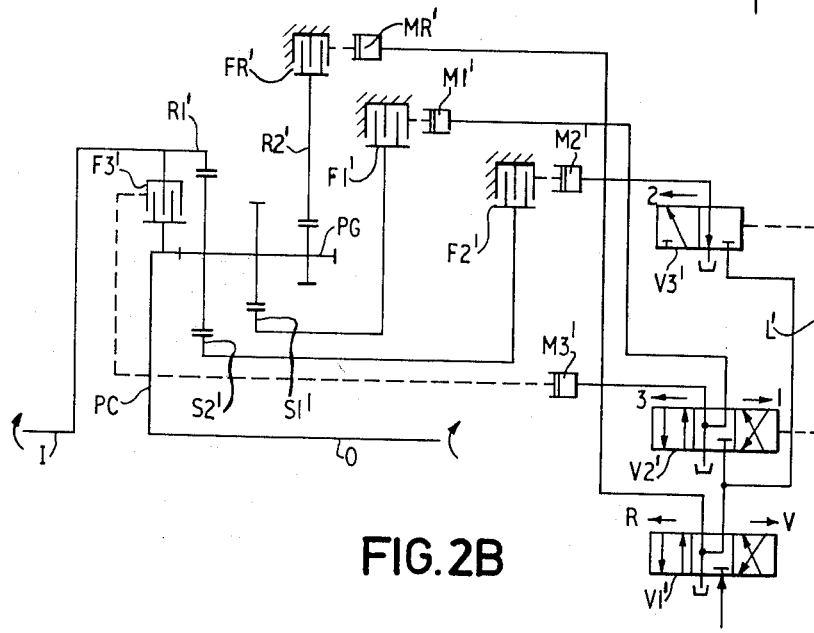
FIG. 2B is a diagrammatic view of a similar vehicle gearbox with however only three forward gears and a modified embodiment of the hydraulic valve system according to the invention with two 4/3-way valves and one 3/2-way valve.

The gearbox shown in FIG. 2B differs from that shown in FIG. 1 only in that instead of four forward gears, it has three due to ommission of the sunwheel meshing with the tooth systems of smallest diameter. The other sunwheels and the brakes, the clutch and the servomotors are numbered the same as in FIG. 2A but are further identified by an "apostrophe" to distinguish them from FIG. 2A. Since valve V3' has only two working positions and three connections it is thus a 3/2-way valve. Otherwise, the valve arrangement corresponds to that shown in FIG. 2A.

The valve arrangement shown in FIGS. 2A and 2B with a plurality of valves which in addition to an inoperative position have at most two working positions, permits the use of plate valves with rapidly opening large throughflow cross-sections which, as show, can be grouped together and mounted directly on the gearbox H in FIG. 3 which, in the example illustrated, accommodates an epicyclic transmission according to FIG. 2B. Although for this epicyclic gearing, the third valve only needs to be a 3/2-way valve, the valve assembly explained hereinafter with reference to FIGS. 4 to 8 contains three identically constructed 4/3-way valves, one of which can if necessary easily be converted to a 3/2-way valve.

Figure 4:
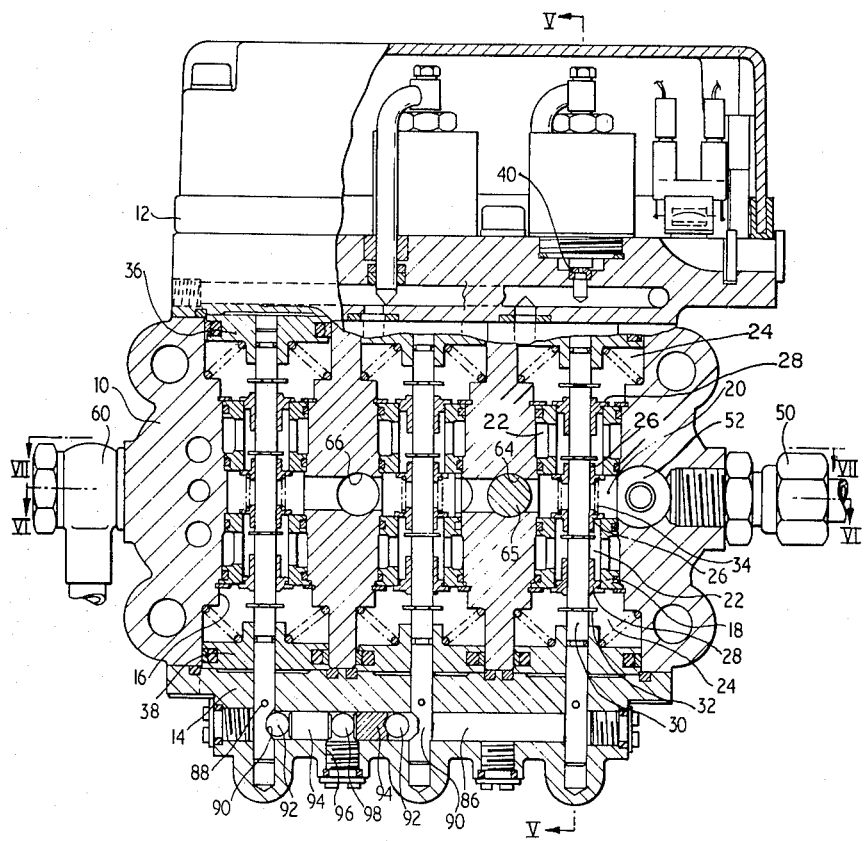
FIG. 4 shows on an enlarged scale an axial section taken on the line IV—IV in FIG. 3 through the hydraulic valve assembly accommodated in a common housing except that it differs from FIGS. 2B and 3 because, all three valves are constructed herein as 4/3-way valves in accordance with FIG. 2A.
Figure 5:
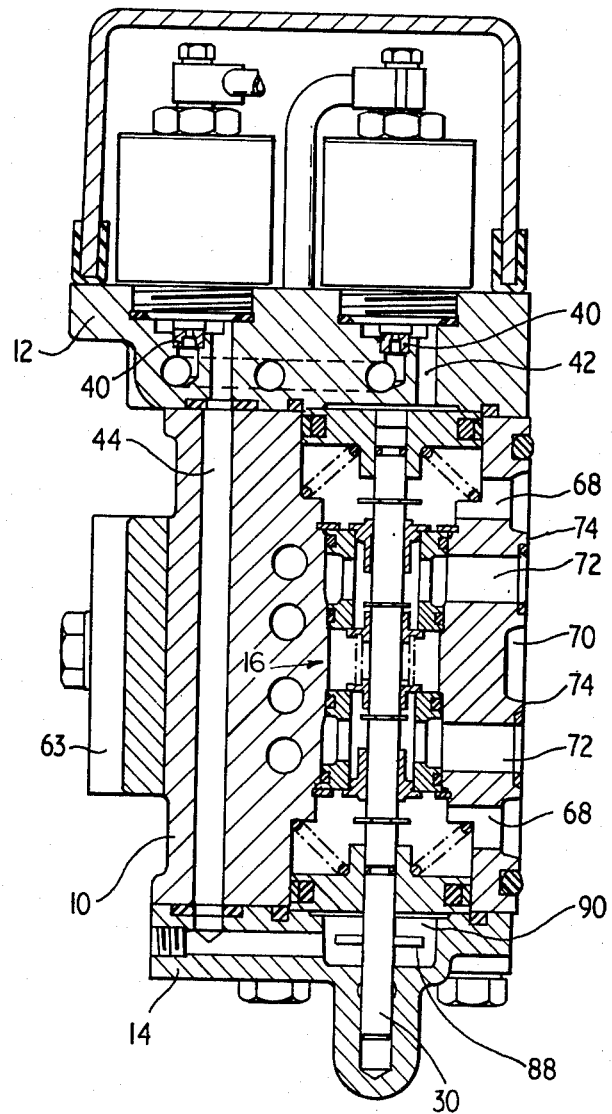
FIG. 5 is an axial section through the valve assembly taken on the line V—V in FIG. 4.

As shown in particular in FIGS. 4 and 5, the valve assembly has a casing consisting of a middle part 10, an upper part 12 and a lower part 14. The middle part 10 of the housing contains three side by side symmetrically constructed multiply stepped identical bores 16 which are sub-divided by sleeve-shaped inserts 18 into five chambers, namely an inlet chamber 20 located in the longitudinal centre, adjacent thereto two consumer chambers 22 and in turn adjacent to these two outlet chambers 24. The ends of the inserts 18 form, directed in opposition to each other, annular valve seats which can be covered by valve plates 26, 28. The valve plates 26, 28 are axially bored and are mounted for limited axial movement on an actuating rod 30 extending through the entire valve bore 16 and provided with disc-shaped drive members 32. By displacement of the actuating rod 30 out of its midway position in one direction or the other, in each case an inner valve plate 26 is moved by the associated drive member 32 against the pressure obtaining in the inlet chamber 20 and possibly against the force of a closure spring 34 so that it is lifted off its seat and at the same time another member 32 on rod 30 presses the adjacent valve plate 28 against its seat its insert 18, so that the consumer chamber 22 which was previously connected to the outlet chamber 24 becomes separated therefrom and connected to the inlet chamber 20. The valve plates 26, 28 located on the other side of the inlet chamber 20 remain unaffected during this movement of the actuating rod 30, so that the consumer chamber 22 on that other side retains its connection with its associated outlet chamber 24.

For displacement of the actuating rod 30 out of the midway position into one or other direction, there are in the widened-out end portions of the valve bore 16 spring loaded servopistons 36, 38 which are provided with axial bores and which accommodate for limited axial movement the actuating rod 30.

When pressurised fluid is fed against the rear of such a piston, a collar-shaped projection thereon engages the adjacent drive member 32 on the actuating rod 30 and this brings about reversal of the adjacent valve plates 26, 28 into the open or closed position.

Figure 6:
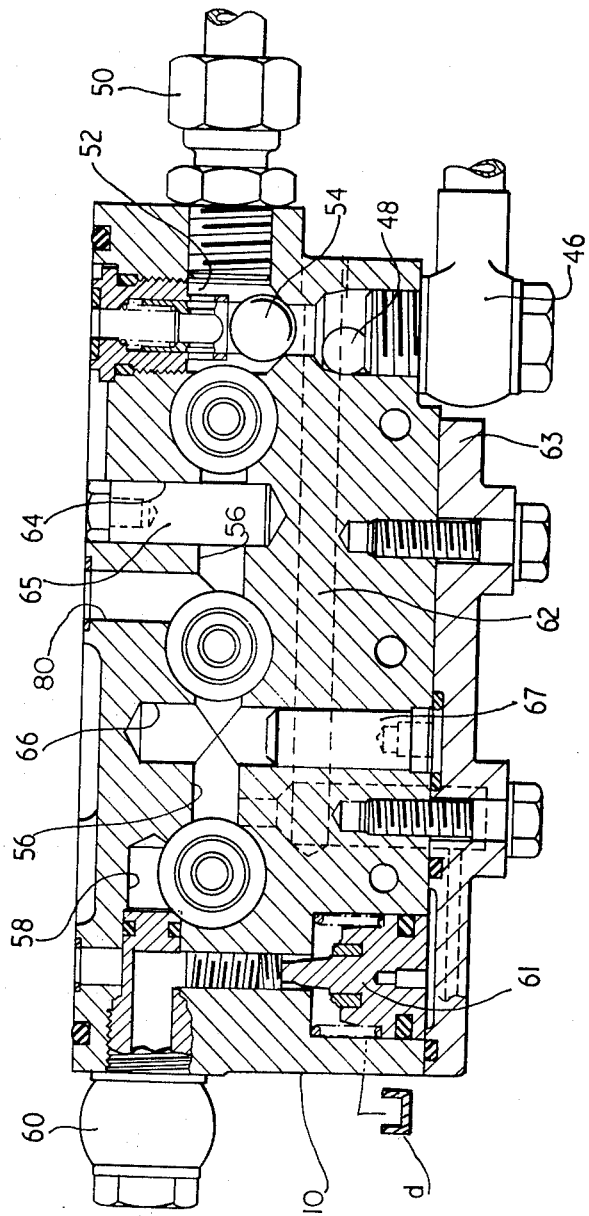
FIG. 6 is a cross-section through the valve assembly taken on the line VI—VI in FIG. 4.

For the controlled feeding of pressurised fluid to the pistons 36, 38, the upper part 12 of the casing has, located in pairs, six magnetic valves 40, from which passages 42, 44 in the casing parts 12, 10, 14 lead to the rear sides of the pistons 36, 38. Operating fluid which is at relatively low pressure is fed to the magnetic valves 40 through a connection 46 and a passage 48 in the casing parts 10 and 12 (FIGS. 6 and 7).

A pipe connection 50 for high pressure operating fluid for actuating the servomotors leads to a valve chamber 52 for a non-return valve 54 through which low pressure operating fluid can flow out of the pipe connection 46 into the valve chamber 52 if there is no higher counterpressure therein, as is the case when filling a servomotor. The valve chamber 52 is immediately adjacent the inlet chamber 20 of the valve shown on the right in FIGS. 4 and 6, from which a bore 56 extends to the inlet chambers of the other two valves. Furthermore, a bore 58 with a pipe connection 60 for similarly high-pressure operating fluid extends to the inlet chamber 20 of the left-hand valve. The pipe connection 60 is, when the valve assembly is used for a gearbox according to FIGS. 2A or 2B, so constructed that it occludes the part of the bore 58 which leads to the inlet chamber 20 of the left-hand valve and feeds the operating fluid fed through the pipe connection 60 to a pressure limiting valve 61 which, upon opening, draws off to drain more or less pressure free working fluid through a passage in the casing part 10 shown diagramatically at d in FIG. 6. The control piston of the pressure limiting valve 61, spring loaded in the opening direction, is, via a system of passages 62 in the casing part 10 and a separable casing cover 63, subject to the action of the low pressure working fluid from the pipe connection 46. In this way, the pressure limiting valve 61 ensures that the fluid pressure present in the inlet 60, and hence via connections (not shown in FIG. 6, but shown diagramatically in FIGS. 9–11) in inlet 50 and in the inlet chambers 20 of the valves, in proportion to the actuating pressure for the servopistons 36, 38, the area of which amounts to ten times the effective area of the valve plates 26, does not assume excessively high valves at which the valves can no longer be actuated.

Between the inlet chambers 20, the bore 56 intersects with two transverse bores 64, 66 incorporated from opposite sides. Inserted into the transverse bore 64 is a plug 65 which interrupts the bore 56. The transverse bore 66 is closed off outwardly by a plug 67.

As the rear view of the valve assembly in FIG. 8 in conjunction with FIG. 5 shows, bores 68 extend from the outlet chambers 24 to a drawn-in zone 70 at the rear of the casing part 10, which forms a collecting space for pressurised fluid drawn off from the servomotors via the valves and which is discharged via a passage 71 within the gearbox casing H (FIG. 3) into the sump disposed therein. Furthermore, from the consumer chambers 22, connecting bores 72 lead to the rear of the casing part 10, which end there in the region of collar-like projections 74 in the contacting plane of the valve casing on the gearbox casing H and communicate with passages—such as for example passages 76, 77 in FIG. 3—which lead to the servomotors M1 and M3 for the friction brake F1 and the friction clutch F31 of the gear mechanism.

The lower consumer chamber 22 of the right-hand valve in FIG. 4 is connected via a communicating passage 78 indicated by broken lines in FIG. 8 and disposed within the gearbox casing H, to a central inlet bore 80 which extends from the plane of contact of the valve casing to the inlet chamber 20 of the middle valve and from there through the bore 56 to the inlet chamber 20 of the valve shown on the left in FIG. 4.

Furthermore discharging into the consumer chambers 22 and starting from the front of the casing part 10 are bores 82 into which it is possible to insert pressure limiting valves 84 for individual regulation of the actuating pressure for the servomotors and which can be adjusted by slackening of the casing cover 63.

It is evident that the valve assembly shown in FIGS. 4 to 8 forms in conjunction with the plug 65 in the bore 56 and the communicating passage 78 the same valve arrangement with three 4/3-way valves as is diagrammatically shown in FIG. 2A, and the valve shown on the right in FIG. 4 corresponds to the valve V1 in FIG. 2B, while the one in the center corresponds to V2 and the one on the left in FIG. 4 corresponds to V3.

For the reciprocal interlocking of the center and left valves V2 and V3 of FIG. 4, which in other applications may also occur between the middle valve and the valve shown on the right in FIG. 4, the actuating rods 30 of the valves are extended into the bottom part 14 of the casing which is provided with corresponding bores and which moreover comprises a transverse bore 86 intersecting with these bores. Secured by pins 88 to prevent their rotation, the actuating rods 30 of the valves which are to be interlocked are furthermore provided with recesses 90 bounded by oblique faces, and which, in the midway position of the actuating rods and thus of the valves, are located at the height of the transverse bore 86. In this position, balls 92 at the ends of two locking pins 94 displaceable in the transverse bore 86 can engage into the recesses 90. A further ball 98 which can be inserted through a closeable aperture 96 between the locking pins 94 ensures that the two outer balls 92 are kept apart by such a distance that one of these balls can only emerge from the associated recess 90 when the other clicks into the recess there. In this way, it is ensured that the two valves which are to be interlocked can only be moved individually out of the midway position into one or other of the actuating positions. Furthermore, the inclined faces on the recesses ensure that in the event of a change of valve actuation, the newly actuated valve assists the return of the previously actuated valve to its position of rest, subject to this valve no longer being actuated.

The aforedescribed valve assembly can with a slight modification also be used for the gearbox according to FIG. 2B which has only three forward speeds. To this end, only one set of valve plates 26, 28 and the associated annular insert 18 will need to be removed from the middle valve or the valve on the left in FIG. 4 and replaced by a plug inserted into the valve bore 16 and through which the actuating rod 30 extends for sealing-tight movement after removal of the relevant drive members 32. Furthermore, also the associated valve piston 36 or 38 with the associated magnetic valve 40 can be omitted. In this way, the relevant valve forms a 3/2-way valve with which only one servomotor of the gearbox such as for example the servomotor for engaging the second gear M2, can be controlled.

FIGS. 9a and 9b show the location of the valves for the gearboxes according to FIGS. 2A and 2B—here described as "M4R" and "M3R" respectively—again diagrammatically illustrated in conjunction with a pressurised fluid source 100, the pressure limiting valve 61 and the non-return valve 54 being shown in the drawings.

The pressurised fluid source 100 consists of a low pressure pump 102 of relatively large capacity and a high pressure pump 104 of only small capacity the inlet of which is connected to the outlet of the low pressure pump 102 lines 106, 108 with pressure limiting valves 107, 109 respectively lead from the two pumps to the low pressure connection 46 or the high pressure connection 50, 60 respectively on the valve casing. Between the lines 106 and 108 there is a further non-return valve 111.

The non-return valve 111 and the non-return valve 54 open whenever a new servomotor is switched on by one of the multi way valves. In this way, there is a rapid filling of the servomotor while at the same time the relevant brake or clutch is smoothly engaged. As soon as filling is completed, the pressure in the high pressure line 108 rises so that the non-return valves close, and the high pressure pump 104 raises the pressure in the line 108 and thus in the switched on servomotor so that it reaches the necessary holding pressure of the brake or clutch.

FIGS. 9c and 9d show modification of the valve assembly illustrated in FIGS. 9a and 9b by showing respectively one and two additional 4/3-way valves V4, V5, respectively, with which further mechanical gear mechanisms can be shifted to double or even quadruple the number of gears. "M2" (FIG. 9c) denotes what is referred to as a "range gear" which is downstream of the 4-speed gearbox M4R, and which can optionally be switched to a "direct drive gear" M2H or to a sharp reduction M2L. In the latter condition, four further greatly stepped down gears are obtained. In contrast in FIG. 9d, "U" denotes a so-called "split gear" which in addition to a direct drive gear can be shifted to low reduction to provide intermediate gears between the gear stages of the 4-speed gearbox.

The additional 4/3-way valves V4 and V5 are fed independently of the "forward travel" or "reverse travel" (position of the valve V1). They can be located separately. Within the framework of the invention, it is however also possible to group them together with the other valve into a valve assembly or valve block in a common housing.

FIGS. 10a to 10d show the same valve groupings as in FIGS. 9a-9d for the same applications, but where the source of pressurised fluid is extended by the provision of a second low pressure pump 112 and an electrohydraulic by-pass valve 114, with which the second low pressure pump 112 can be switched off and on under certain conditions of operation.

While FIGS. 9a-9d and 10a-10d show instances of application of the invention to purely mechanical gear mechanisms, FIGS. 11a to 11d illustrate instances of application in which in addition to the mechanical gear mechanisms which can be shifted under load, a hydrodynamic-mechanical gear mechanism with a hydraulic torque converter with direct drive coupling and a single rotation or double rotation gear mechanisms is provided, by which the guide disc of the torque converter can optionally be rotated in opposition to the turbine wheel or can be held fast against rotation. The source of pressurised fluid is the same as in FIGS. 10a-10d. In contrast to FIGS. 9a-9d and 10a-10d, however, the valve V1 for engaging forward or reverse travel is removed from the valve assembly and grouped together with a 4/3-way valve VHD for switching over between hydraulic drive and direct drive and a further 4/3-way valve VDS for switching over between double rotation and single rotation of the converter.

If according to FIGS. 11a and 11b, the hydrodynamic-mechanical gear mechanism has on its downstream side only one 3 or 4-speed mechanical gearbox with reverse gear, then in the remaining valve assembly only two way valves are needed to constitute the valves V2 and V3 and the bore for the third valve can, by inserting a plug into the transverse bore in the middle part 10 of the casing (FIG. 6) be isolated from the inlet chambers 20 of the other two valves, the plug 65 being in addition removed and replaced by a closure plug for the transverse bore 64. When a "range gear" (M2) is added, the third valve in the valve assembly is available to operate it and if a further "split gear" (U) is added, only one further valve is required within the assembly.

In the last two cases mentioned (FIGS. 11c and 11d), a by-pass line 110 is also required to allow pressurised fluid to be fed to the additional gear mechanisms independently of the position of the valve V1.

In all instances of application according to FIGS. 11a to 11d, there is moreover no non-return valve 54 between the low pressure line 106 and the high pressure line 108. In the cases of application according to FIGS. 11a and 11b, the pipe connection 50 is replaced by a plug. In the cases of application 11c and 11d, instead of the non-return valve 54, a (not shown) plug is inserted into the valve chamber 52 to occlude the connection between this valve chamber and of the pipe connection 46 and at the same time, via a transverse bore provided in the plug, to link the pipe connection 50 to the inlet chamber 20 of the right-hand valve.

We claim:

1. A hydraulic valve system comprising a plurality of multiway valves of the disc type having an elongated axially movable member with discs mounted thereon such that axial movement of the elongated member causes at least one disc to move axially off of its seat to permit the flow of fluid therepast,
    a first said multi-way valve of the disc type having a pressure connection connected to a source of pressurized fluid and two consumer connections, each alternately connectable to the pressurized fluid connection, and a pair of drain connections, each alternately connectable to a consumer connection not then connected to the pressure connection,
    one of said consumer connections being further connected to the pressure connection of an interlocked valve system which comprises at least a second and a third multi-way valve of the said disc type, each of the second and third multi-way valves having means for connecting their respective pressure connections to at least one other consumer connection thereof,
    and including interlocking means for interlocking said second and third multi-way valves so that only one of those valves can have a consumer connection connected to a pressure connection at any one time.

2. A hydraulic system for controlling the gears in a vehicle gear box having at least three forward gears and one reverse gear, and including a servomotor for effecting engagement of said gears, and including the valve system according to claim 1 for controlling said servomotors, wherein the consumer connections of said first multi-way valve are connected one to the reverse gear and one to the interlocked valve system, and wherein the consumer connections of the second and third multi-way valves of the interlocked valve system are connected each to a different one of the forward gear servomotors, whereby the pressure fluid entering the interlocked valve system is connected to one consumer connection while the other consumer connections thereof are connected to the drain connection.

3. A hydraulic system according to claim 2, including means for delivering to the valve system both low pressure fluid and high pressure fluid, including means for delivering the low pressure fluid to operate the multi-way valves, and to initially fill the servomotors, and including means for delivering the high pressure fluid to further increase the pressure in the servomotors.

4. A system according to any one of claims 1, 2 or 3, wherein at least the valves of the interlocked valve system are formed in one common housing.

5. A system according to claim 4, wherein the interlocking means includes a mechanical device constructed so that only one of the multi-way valves of the interlocked valve system can have a consumer connection in communication with its pressure connection.

6. A system according to claim 2, in which the common housing also includes said first multi-way valve.

7. A hydraulic system according to claim 2, said vehicle further including a two speed gear in series with said gear box, a further multi-way valve for said two speed gear, means for delivering pressurized fluid to the further multi-way valve separately from the other said multi-way valves, and wherein all of the first, second, third and further multi-way valves are formed in a common housing.

8. A system according to claim 1, 2 or 3 in which each interlocked valve of the interlocked valve system has an axially movable positioning member with a recess directed towards the positioning member of the other valve and in which between the two positioning members there is disposed a longitudinally movable interlocking member which can alternately engage one or other of the two recesses.

9. A system according to claim 8 wherein three of the said valves are interlocked in pairs so that when one valve is used to convey pressure fluid the other two valves are in neutral.

10. A system according to claim 8 wherein the recesses are provided with sloping surfaces for movement of the interlocking member out of one recess into the other upon operating of one of the positioning members and for restoring the other positioning member to its inoperative position.

11. A system according to claim 10, wherein the interlocking member comprises two interlocking pins provided at their outer ends with balls which are spaced apart by a further ball.

12. A system according to claim 1, 2 or 3 including a common housing for accommodating at least three valves which are disposed adjacent to each other, of which at least two are constructed as said multi-way valves having inlet chambers connected to said pressure connections and which are disposed at the axial centers of the valve bores, outlet chambers connected to said drain connections and which are located at the ends of the valve bores, and with consumer chambers for each valve connection to said consumer connections and which are located between the appropriate inlet chamber and outlet chamber.

13. A system according to claim 12, including a connecting bore extending inside the valve housing between the inlet chambers.

14. A system according to claim 13, including transverse bores which extend into the connecting bore to optionally permit insertion of plugs to interrupt the connecting bore.

15. A system according to claim 12, including independently adjustable pressure limiting valves associated with the consumer chambers of the valves and disposed inside the valve housing.

16. A system according to claim 1, 2 or 3, wherein the valves are actuated by servopistons which are subject to the action of low pressure fluid.

17. A system according to claim 16, wherein the low pressure fluid fed to the valve servomotors is controlled by electro-hydraulic valves.

18. A hydraulic system according to claim 2, said source of pressurized fluid comprising two pressure fluid generators, one of which supplies the low pressure fluid for filling the said servomotors associated with the gears while the other supplies high pressure fluid for generating holding forces for said servomotors, and including servomotors for operating said valves, said servomotors which control the valves being subject to the action of the low pressure fluid.

19. A hydraulic system according to claim 18, including means to feed the higher pressure fluid directly to the inlet connection of the valves and for feeding low pressure fluid to said inlet connection via a non-return valve.

20. A hydraulic system according to claim 19, wherein said valves are located in a common housing and wherein the non-return valve is also located inside said housing.

21. A hydraulic system according to claim 18 including a pressure limiting valve for reducing the higher pressure as the lower pressure falls and disposed between the two pressurized fluid generators.

22. A hydraulic system according to claim 21 wherein said valves are located in a common housing, and wherein the pressure limiting valve is located inside the valve housing.

23. A hydraulic valve system according to claim 21 wherein the servomotors controlling the valves have pistons which have a piston area in relation to the surface of the valve plates acting between the inlet connections and the consumer connections to ensure that they open at the higher pressure determined by the pressure limiting valve in proportion to the lower pressure.

* * * * *